(12) United States Patent
Shinozaki et al.

(10) Patent No.: US 6,785,552 B2
(45) Date of Patent: Aug. 31, 2004

(54) LOCATION MANAGING METHOD FOR MANAGING LOCATION OF MOBILE STATION IN MOBILE WIRELESS PACKET COMMUNICATION SYSTEM AND MOBILE WIRELESS PACKET COMMUNICATION SYSTEM

(75) Inventors: Takuya Shinozaki, Yokosuka (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 481 days.

(21) Appl. No.: 09/739,204

(22) Filed: Dec. 19, 2000

(65) Prior Publication Data

US 2001/0027107 A1 Oct. 4, 2001

(30) Foreign Application Priority Data

Dec. 28, 1999 (JP) .......................................... 11-375799

(51) Int. Cl.[7] ................................................ H04Q 7/20
(52) U.S. Cl. .................... 455/456.1; 455/445; 455/449; 370/338
(58) Field of Search ............................ 455/456.1, 445, 455/432.1, 446, 449; 370/328, 338

(56) References Cited

U.S. PATENT DOCUMENTS

| | | |
|---|---|---|
| 5,442,683 A | 8/1995 | Hoogeveen |
| 5,713,073 A | 1/1998 | Warsta |
| 5,956,637 A | 9/1999 | Ericsson et al. |
| 6,078,575 A * | 6/2000 | Dommety et al. .......... 370/338 |
| 6,275,706 B1 * | 8/2001 | Rune ........................ 455/456.1 |

FOREIGN PATENT DOCUMENTS

| | | |
|---|---|---|
| EP | 0 835 034 | 4/1998 |
| JP | 2-206237 | 8/1990 |
| JP | 7-312770 | 11/1995 |
| JP | 9-51570 | 2/1997 |
| WO | WO 93/13631 | 7/1993 |
| WO | WO 97/31500 | 8/1997 |

OTHER PUBLICATIONS

J. Z. Wang, IEEE Journal on Selected Areas in Communications, vol. 11, No. 6, pp. 850–860, "A Fully Distributed Location Registration Strategy for Universal Personal Communication Systems", Aug. 1993.

* cited by examiner

*Primary Examiner*—Erika Gary
(74) *Attorney, Agent, or Firm*—Oblon, Spivak, McClelland, Maier & Neustadt, P.C.

(57) ABSTRACT

A location managing method for managing a location of a mobile station in a mobile wireless packet communication system in which each of communication nodes down to a base station have a hierarchical structure, wherein a route from a communication node positioned at a highest layer of the hierarchical structure to a base station of a cell in which a mobile station is located, is managed as location information of the mobile station, by being distributed to the communication node located at the highest layer of the hierarchical structure and to each of communication nodes in the route to the base station.

11 Claims, 11 Drawing Sheets

FIG. 4

| USER ADDRESS | PACKET TRANSFER DESTINATION |
|---|---|
| 100.100.100.100 | H-PTE1 |
| 100.100.100.101 | H-PTE1 |
| 100.100.100.102 | H-PTE2 |
| 100.100.100.103 | H-PTE1 |
| 100.100.100.104 | H-PTE2 |
| 100.100.100.106 | H-PTE2 |
| 100.100.100.108 | H-PTE2 |
| 100.100.100.109 | H-PTE1 |
| 100.100.100.110 | H-PTE1 |
| 100.100.100.111 | H-PTE2 |
| 100.100.100.112 | H-PTE2 |
| 100.100.100.114 | H-PTE1 |
| 100.100.100.115 | H-PTE1 |
| 100.100.100.116 | H-PTE1 |
| 100.100.100.117 | H-PTE2 |
| 100.100.100.119 | H-PTE1 |
| 100.100.100.120 | H-PTE2 |
| 100.100.100.121 | H-PTE2 |
| 100.100.100.122 | H-PTE2 |
| 100.100.100.123 | H-PTE1 |
| 100.100.100.125 | H-PTE1 |
| 100.100.100.127 | H-PTE2 |
| 100.100.100.128 | H-PTE2 |
| 100.100.100.130 | H-PTE1 |
| ⋮ | ⋮ |
| 100.100.100.245 | H-PTE1 |
| 100.100.100.247 | H-PTE2 |
| 100.100.100.248 | H-PTE1 |
| 100.100.100.249 | H-PTE2 |
| 100.100.100.250 | H-PTE1 |
| 100.100.100.251 | H-PTE2 |

FIG. 5

| USER ADDRESS | PACKET TRANSFER DESTINATION |
|---|---|
| 100.100.100.100 | L-PTE 1 |
| 100.100.100.101 | L-PTE 3 |
| 100.100.100.103 | L-PTE 1 |
| 100.100.100.109 | L-PTE 1 |
| 100.100.100.110 | L-PTE 2 |
| 100.100.100.114 | L-PTE 1 |
| 100.100.100.115 | L-PTE 1 |
| 100.100.100.116 | L-PTE 3 |
| 100.100.100.119 | L-PTE 1 |
| 100.100.100.123 | L-PTE 2 |
| 100.100.100.125 | L-PTE 1 |
| 100.100.100.130 | L-PTE 2 |
| 100.100.100.131 | L-PTE 3 |
| 100.100.100.133 | L-PTE 2 |
| 100.100.100.135 | L-PTE 1 |
| 100.100.100.136 | L-PTE 1 |

⋮

| | |
|---|---|
| 100.100.100.242 | L-PTE 1 |
| 100.100.100.244 | L-PTE 3 |
| 100.100.100.245 | L-PTE 1 |
| 100.100.100.248 | L-PTE 2 |
| 100.100.100.250 | L-PTE 1 |

FIG. 6

| USER ADDRESS | PACKET TRANSFER DESTINATION |
|---|---|
| 100.100.100.100 | B S 1 |
| 100.100.100.103 | B S 2 |
| 100.100.100.109 | B S 4 |
| 100.100.100.114 | B S 6 |
| 100.100.100.115 | B S 1 |
| 100.100.100.119 | B S 5 |
| 100.100.100.125 | B S 3 |
| 100.100.100.135 | B S 1 |
| 100.100.100.136 | B S 2 |
| 100.100.100.138 | B S 5 |
| 100.100.100.139 | B S 3 |
| 100.100.100.141 | B S 6 |
| 100.100.100.142 | B S 4 |
| 100.100.100.143 | B S 1 |
| ⋮ | ⋮ |
| 100.100.100.240 | B S 1 |
| 100.100.100.242 | B S 5 |
| 100.100.100.245 | B S 2 |
| 100.100.100.250 | B S 1 |

FIG. 7

| USER ADDRESS | USING CHANNEL |
|---|---|
| 100.100.100.100 | CH 1 |
| 100.100.100.115 | CH 2 |
| 100.100.100.135 | CH 3 |
| 100.100.100.143 | CH 4 |
| 100.100.100.146 | CH 5 |
| 100.100.100.152 | CH 6 |
| 100.100.100.158 | CH 7 |
| 100.100.100.166 | CH 8 |
| 100.100.100.170 | CH 9 |
| ⋮ | ⋮ |
| 100.100.100.231 | CH 10 |
| 100.100.100.240 | CH 11 |
| 100.100.100.250 | CH 12 |

LOCATION MANAGING METHOD FOR MANAGING LOCATION OF MOBILE STATION IN MOBILE WIRELESS PACKET COMMUNICATION SYSTEM AND MOBILE WIRELESS PACKET COMMUNICATION SYSTEM

BACKGROUND OF THE INVENTION

This application claims the benefit of a Japanese Patent Application No.11-375799 filed Dec. 28, 1999, in the Japanese Patent Office, the disclosure of which is hereby incorporated by reference.

1. Field of the Invention

The present invention generally relates to location managing methods for managing locations of mobile stations in mobile wireless packet communication systems and mobile wireless packet communication systems, and more particularly to a location managing method which hierarchically manages located cell information and registered location information of mobile stations in a mobile wireless packet communication system, and to a mobile wireless packet communication system which employs such a location managing method.

2. Description of the Related Art

In conventional mobile wireless packet communication systems, a home location register (HLR) manages location information which indicates a cell of a base station in which each of mobile stations are located, and a route for a packet addressed to each mobile station is determined based on this location information. In other words, the location information such as located cell information of the mobile stations is centrally managed by the HLR.

However, in such wireless packet communication systems, the routes of the packets addressed to and sent to the mobile stations are searched for each of the users (transmitting destinations). For this reason, when the location information is centrally managed by the HLR as described above, the load on the HLR when searching the routes increases as the number of users increases and the traffic increases.

In addition, when the location information is updated during a handover of the mobile station, the load on the HLR when updating the location information also increases as the number of users increases and the moving frequency of the mobile station increases.

Furthermore, because the location information of the mobile station must be read from the HLR, a delay is generated in the route searching due to the increase of the data traffic and the increased size of a routing table which result from the increase of constant connection type users.

SUMMARY OF THE INVENTION

Accordingly, it is a general object of the present invention to provide a novel and useful location managing method for managing a location of a mobile station in a mobile wireless packet communication system, and a mobile wireless packet communication system, in which the problems described above are eliminated.

More particularly, a first object of the present invention is to provide a location managing method for managing a location of a mobile station in a mobile wireless packet communication system, which can reduce a processing load when searching routes of mobile stations and updating location information.

Further, a second object of the present invention is to provide a mobile wireless packet communication system which is applied with the above described location managing method for managing the location of the mobile station.

Still another object of the present invention is to provide a location managing method for managing a location of a mobile station in a mobile wireless packet communication system in which each of communication nodes down to base stations have a hierarchical structure, wherein a route from a communication node positioned at a highest layer of the hierarchical structure to a base station of a cell in which the mobile station is located, is managed as location information of the mobile station, by being distributed to the communication node located at the highest layer of the hierarchical structure and to each of communication nodes in the route to the base station. According to this location managing method for managing the location of the mobile station, when the mobile station moves to another cell of another base station, only communication nodes in a differing route portion between the route to the base station of the cell in which the mobile station was located before the move and the route to the other base station of the other cell to which the mobile station moves need to modify route management with respect to the mobile station, because the route from the communication node positioned at the highest layer of the hierarchical structure to the base station of the cell in which the mobile station is located is managed as the location information of the mobile station by being distributed to the communication node located at the highest layer of the hierarchical structure and to each of communication nodes in the route to the base station. Therefore, the first object described above is achieved.

From the point of view of providing a particular distributed management, in the location managing method for managing the location of the mobile station, each of the communication nodes may manage a portion of the route from the communication node positioned at the highest layer of the hierarchical structure to the base station of the cell in which the mobile station is located, in correspondence with the mobile station.

From the point of view of providing a simpler management, in the location managing method for managing the location of the mobile station, each of the communication nodes may manage a communication node positioned in an immediately lower layer and the mobile station in correspondence with each other. According to this location managing method for managing the location of the mobile station, only the route portion between each communication node and the communication node positioned in the immediately lower layer is managed by each communication node.

In order to carry out the route management at each of the communication nodes when the mobile station moves between cells, in the location managing method for managing the location of the mobile station, when the mobile station moves to an other cell of an other base station, of each of communication nodes positioned in layers higher than that of the other base station of the other cell, a communication node which does not manage a portion of a route to the other base station of the other cell may newly manage the portion of the route in correspondence with the mobile station. According to this location managing method for managing the location of the mobile station, of each of the communication nodes positioned in layers higher than that of the other base station of the other cell, the communication node which does not manage the portion of the route to the other base station of the other cell newly manages the portion of the route in correspondence with the mobile station. In this case, no new route management is carried out in the communication node which already manages the portion of the route to the other base station of the other cell.

In order to minimize the communication traffic, in the location managing method for managing the location of the mobile station, the mobile wireless communication system may make the paging with respect to the mobile station from a plurality of base stations under control of a predetermined communication node, and when the mobile station in a reception waiting state moves between cells of the plurality of base stations, managing contents need not be modified in each of communication nodes positioned in layers higher than that of the base station of the cell to which the mobile station moves. According to this location managing method for managing the location of the mobile station, when the mobile station moves among the plurality of base stations which make the paging, the management contents at each of the communication nodes are not modified even when the route of the communication nodes changes due to the move. For this reason, no communication is made among each of the communication nodes due to the modification of the management contents. In this case, when the paging is made with respect to the mobile station, it is sufficient to modify the management in each of the communication nodes position in the layers higher than that of the base station which actually communicates with the mobile station, for example.

A further object of the present invention is to provide a mobile wireless packet communication system wherein each of communication nodes to a base station form a hierarchical structure, a route from a communication node positioned at a highest layer of the hierarchical structure to a base station of a cell in which a mobile station is located, is managed as location information of the mobile station, by being distributed to the communication node located at the highest layer of the hierarchical structure and to each of communication nodes in the route to the base station, and a packet addressed to the mobile station is successively transferred from the communication node in the highest layer to the base station depending on the route which is distributedly managed, so as to transfer the packet from the base station to the mobile station by a wireless communication. According to the mobile wireless packet communication system of the present invention, it is possible to achieve the second object described above.

In the mobile wireless packet communication system, each of the communication nodes may be provided with a routing table which manages a portion of the route from the communication node positioned at the highest layer of the hierarchical structure to the base station of the cell in which the mobile station is located, in correspondence with the mobile station.

In the mobile wireless packet communication system, the routing table provided in each of the communication nodes may manage a communication node positioned in an immediately lower layer and the mobile station in correspondence with each other.

Furthermore, in the mobile wireless packet communication system, when the mobile station moves to an other cell of an other base station, of each of communication nodes positioned in layers higher than that of the other base station of the other cell, a communication node which is provided with a routing table which does not manage a portion of a route to the other base station of the other cell may update the routing table so as to newly manage the portion of the route in correspondence with the mobile station.

In the mobile wireless packet communication system, a plurality of base stations under control of a predetermined communication node may make the paging with respect to the mobile station, and when the mobile station in a reception waiting state moves between cells of the plurality of base stations, the routing table need not be updated in each of communication nodes positioned in layers higher than that of the base station of the cell to which the mobile station moves.

In order to prevent the packet addressed to the mobile station which assumes a communication state from being transferred to the base station of the cell in which the mobile station was located before the move when the mobile station moves to another cell, in the mobile wireless packet communication system, when the mobile station which assumes a communication state with the base station moves to another cell of another base station, each of communication nodes in a route from a common communication node which is common to a route to the base station of the cell in which the mobile station was located before the move and a new route to the other base station of the other cell to the base station of the cell in which the mobile station was located before the move may delete from a routing table thereof management information of a route portion from the common communication node to the base station of the cell in which the mobile station was located before the move.

In addition, in order to positively transfer the packet addressed to the mobile station and already transferred to the mobile station to the communication node in the original route to the base station before the move at the time when the management of the new route to the other station of the other cell to which the mobile station moves starts, in the mobile wireless packet communication system, each of communication nodes positioned in layers lower than the common communication node and in the route from the common communication node to the base station of the cell before the node, may return the packet addressed to the mobile station to the common communication node. In this mobile wireless packet communication system, the packet addressed to the mobile station is returned to the common communication node, and thus, the packet can successively be transferred to the mobile station via the new route from the common communication node.

Other objects and further features of the present invention will be apparent from the following detailed description when read in conjunction with the accompanying drawings.

BRIEF DESCRIPTION OF THE DRAWINGS

FIG. 4 is a diagram showing an embodiment of a routing table of a GPTE;

FIG. 5 is a diagram showing an embodiment of a routing table of a H-PTE;

FIG. 6 is a diagram showing an embodiment of a routing table of a L-PTE;

FIG. 7 is a diagram showing a routing table of a base station;

DESCRIPTION OF THE PREFERRED EMBODIMENTS

Figure 1:
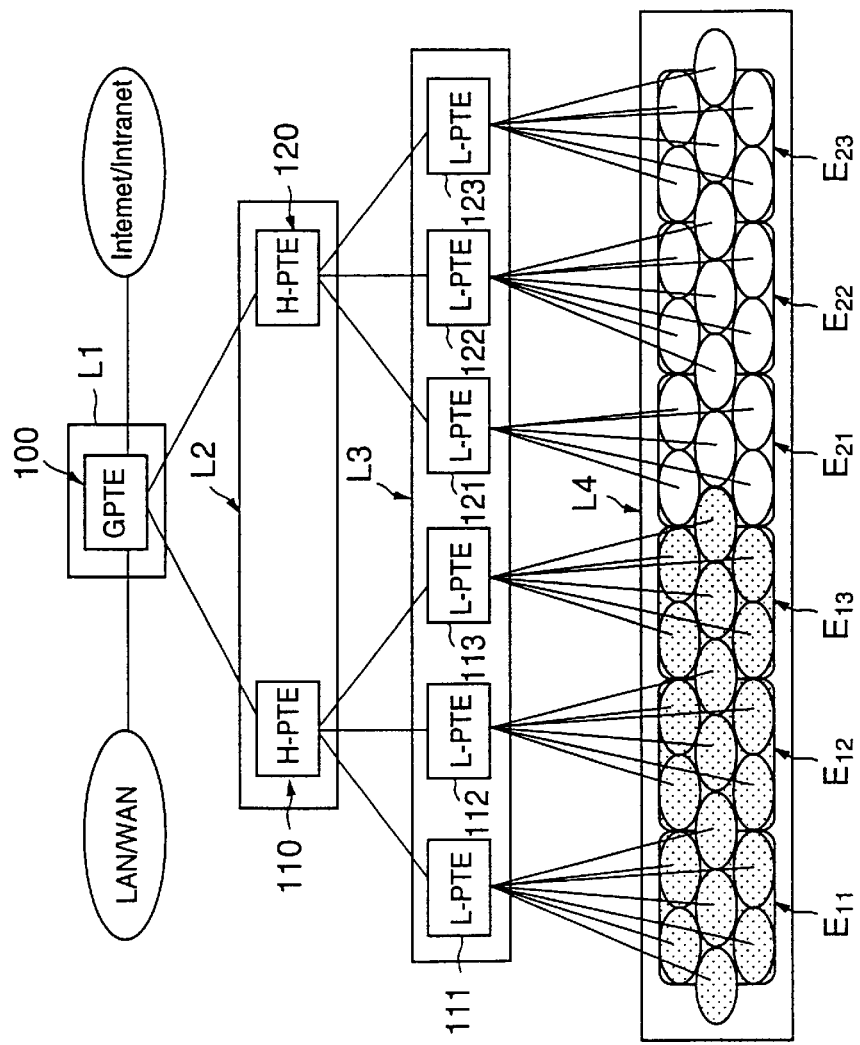
FIG. 1 is a diagram showing a structure of a mobile wireless packet communication system which is applied with an embodiment of a location managing method for managing location of mobile station according to the present invention.

A description will hereinafter be given of embodiments of the present invention by referring to the drawings.

An embodiment of a mobile wireless packet communication system according to the present invention is constructed as shown in FIG. 1, for example. This mobile wireless packet communication system has a network structure and a cell structure such that a hierarchical location registration is made.

In FIG. 1, a gateway packet transmission equipment (GPTE) 100 which forms a gateway connected to other networks such as LAN/WAN and Internet/Intranet, is defined as a first layer L1. The GPTE 100 is connected to high-layer packet transmission equipments (H-PTEs) 110 and 120 which are positioned in a lower layer, that is, a second layer L2. The GPTE 100 has a routing function for transferring packets to the H-PTEs 110 and 120. The H-PTE 110 which is positioned in the second layer L2 is connected to low-layer packet transmission equipments (L-PTEs) 111, 112 and 113 which are positioned in a lower layer, that is, a third layer L3. On the other hand, the H-PTE 120 which is positioned in the second layer L2 is connected to other L-PTEs 121, 122 and 123 which are positioned in the lower third layer L3. The H-PTEs 110 and 120 are defined as nodes having a routing function for transferring packets to the L-PTEs 111, 112 and 113 and the L-PTEs 121, 122 and 123, respectively.

Each of the L-PTEs 111, 112, 113, 121, 122 and 123 positioned in the third layer L3 is connected to a plurality of base stations positioned in a lower layer, that is, a fourth layer L4, and is defined as a node having a paging function and a routing function for transferring packets to the base stations. Each base station positioned in the fourth layer L4 transfers the packets to mobile stations which are located within cells indicated by circular marks in FIG. 1. Each of paging areas E11, E12, E13, E21, E22 and E23 is a collection of cells corresponding to a plurality of base stations which belong to a corresponding one of the L-PTEs 111, 112, 113, 121, 122 and 123. When a mobile station is called, a paging is made from all of the base stations within the paging area which includes the cell in which this mobile station is located.

In a down-transmission, a route is searched based on a routing table provided in each of the communication nodes, and the packets are successively transferred from the communication node in the higher layer to the communication node in the lower layer according to this route. On the other hand, in an up-transmission from the mobile station, each communication node does not search the route because the destination of the packets is uniquely determined at each communication node, and each communication node transfers the packets to the connected communication node in the higher layer.

Figure 2:
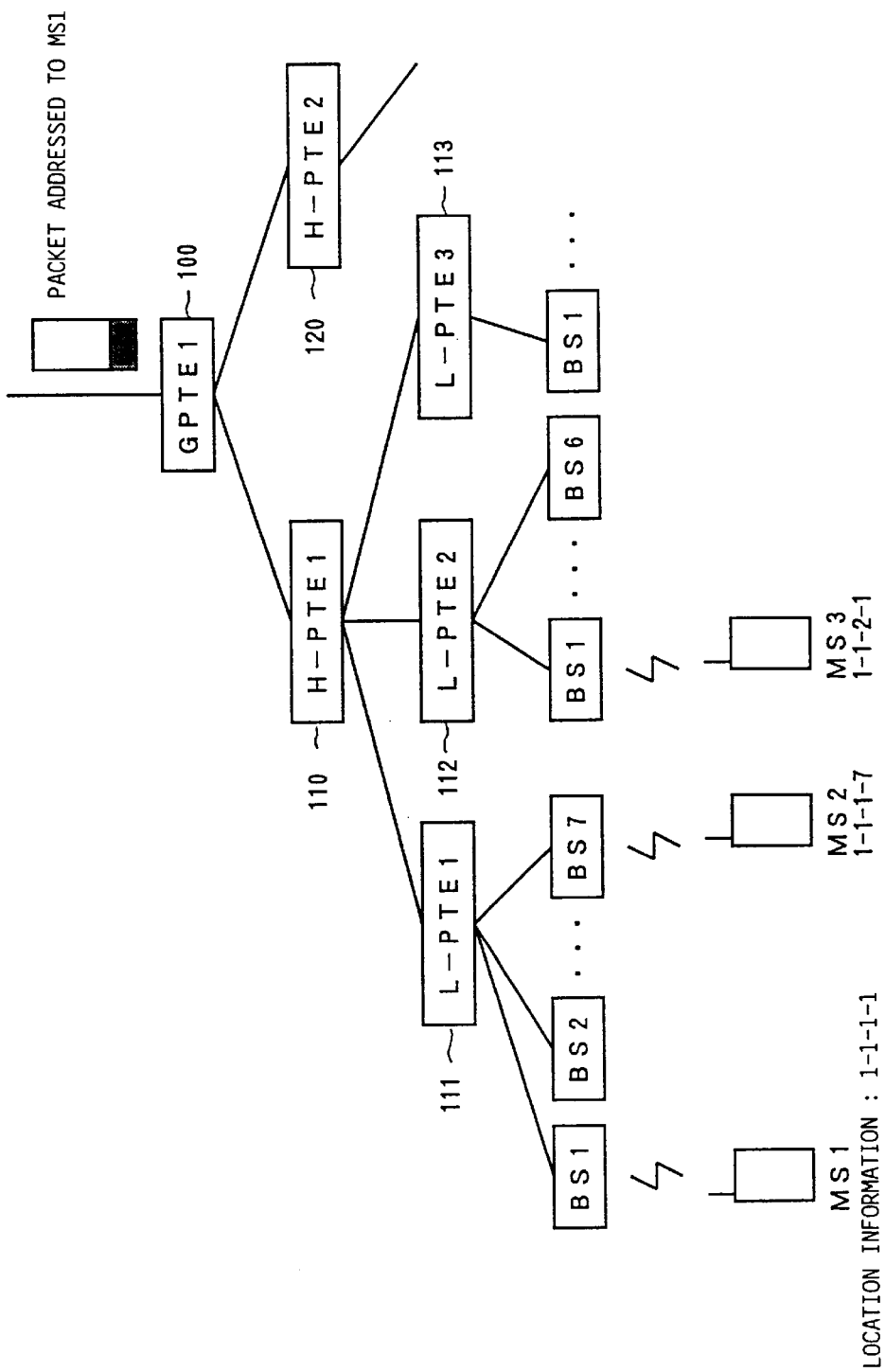
FIG. 2 is a diagram showing an embodiment of location information employed in the mobile wireless packet communication system shown in FIG. 1.

In the mobile wireless packet communication system in which each of the communication nodes are hierarchically connected as described above, location information which indicates the base station of the cell in which the mobile station is located, is formed as follows. As shown in FIG. 2, a node number which is peculiar to each communication node is assigned in each layer of the hierarchical structure, and the location information is formed by ordering the node numbers assigned to each of the communication nodes in the higher layers starting from the base station of the cell in which the mobile station is located, as (GPTE node number)-(H-PTE node number)-(L-PTE node number), for example. The location information of the mobile station located in the cell of a base station BS1 under control of a L-PTE1 is represented by (1-1-1-1), the location information of the mobile station located in the cell of a base station BS7 under control of the L-PTE1 is represented by (1-1-1-7), and the location information of the mobile station located in the cell of the base station BS1 under control of a L-PTE2 is represented by (1-1-2-1), for example.

Next, a description will be given of a location registration of the mobile station, updating of the location registration, and a location management of the mobile station.

In this embodiment, the mobile station is capable of assumed one of two states, namely, a standby state and an active state. In the standby state, the mobile station is not communicating and is in a reception waiting state. On the other hand, in the active state, the mobile station is actually communicating, that is, transmitting and receiving the packets. The mobile station is switched from the standby state to the active state when starting a communication from the mobile station and when the mobile station is called and the packets are transmitted thereto. The mobile station is switched from the active state to the standby state when a session is released.

Each base station transmits within the cell, as broadcast control information, a base station number and communication node numbers (L-PTE node number, H-PTE node number, GPTE node number) of each of the communication nodes in each of the higher layers connected to the base station. When the power of the mobile station located in the cell of a certain base station is turned ON and accordingly assumes the standby state, an initial location registration process is carried out. This initial location registration process is carried out according to a procedure shown in FIG. 3.

Figure 3:
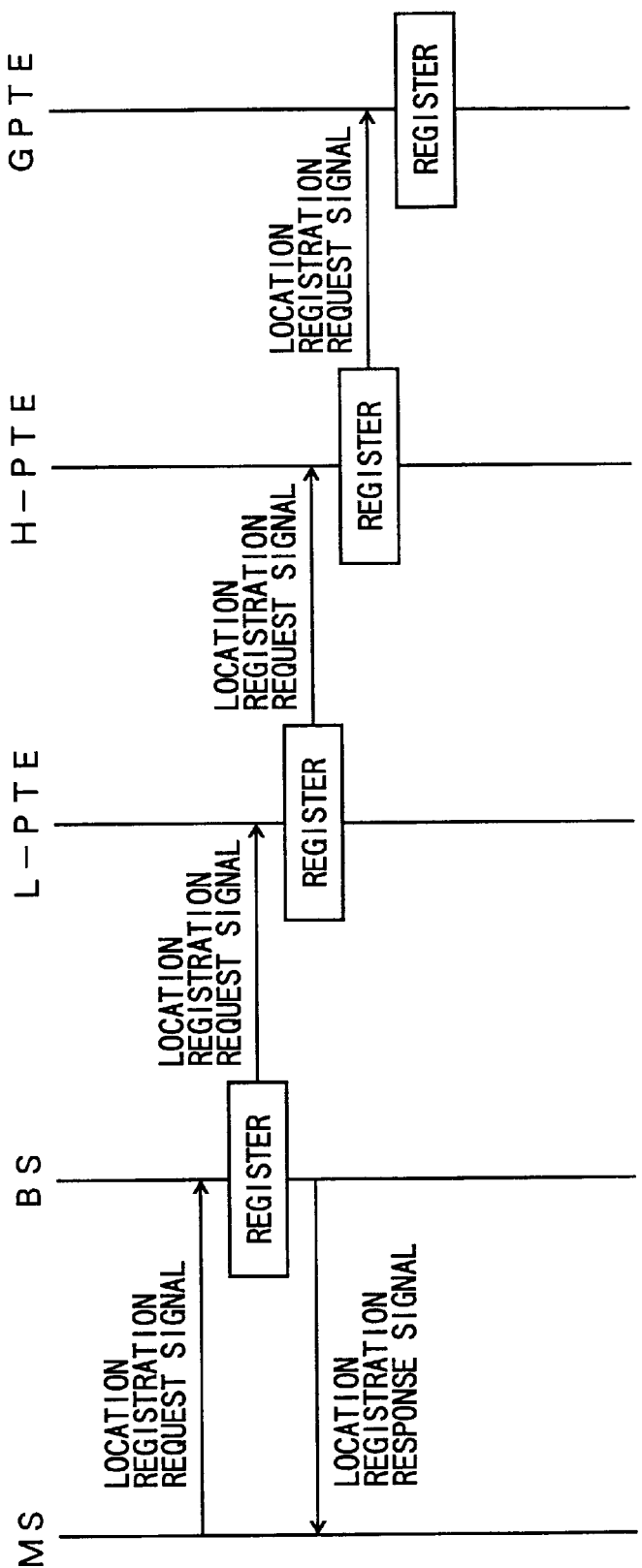
FIG. 3 is a sequential diagram showing a procedure when a mobile station makes an initial location registration.

In FIG. 3, a mobile station MS transmits a location registration request signal with respect to a base station BS of a cell in which the mobile station MS is located. The location registration request signal includes an address for specifying the mobile station MS. The base station BS which receives the location registration request signal further transmits the location registration request signal to the communication nodes in the higher layers. Hence, the location registration request signal is successively transferred from the base station BS to each of the communication nodes L-PTE, H-PTE and GPTE in the higher layers connected to the base station BS, in this order. As a result, the address of the mobile station MS is notified to each of the communication nodes L-PTE, H-PTE and GPTE in the higher layers.

At each of the base station BS and the communication nodes L-PTE, H-PTE and GPTE which are successively notified of the address of the mobile station MS, the notified address of the mobile station MS is registered in a routing table thereof. Similarly, the address of each mobile station located in the cell of each base station is successively notified to the communication nodes in each of the layers, and the routing table in each of the communication nodes becomes as shown in FIGS. 4 through 7, for example.

FIG. 4 shows the routing table in the communication node GPTE positioned in the first layer L1, and FIG. 5 shows the routing table in the communication node H-PTE positioned in the second layer L2. FIG. 6 shows the routing table in the communication node L-PTE positioned in the third layer L3. FIG. 7 shows the routing table in the communication node, that is, the base station BS, positioned in the fourth layer L4. Accordingly, the address (user address) of each mobile station MS which is notified in the above described manner is registered in the routing table of each of the communication nodes GPTE, H-PTE and L-PTE in the higher layers connected to each base station BS. In addition, in the routing table of each of the communication nodes GPTE, H-PTE and L-PTE, a communication node which is positioned in the route to the mobile station MS and in an immediately lower layer is registered as a packet transfer destination, in correspondence with the address of the mobile station MS, as shown in FIGS. 4 through 6.

Similarly, the address (user address) of each mobile station MS which is notified in the above described manner is registered in the routing table of each base station BS. Further, in the routing table of each base station BS, a channel which is to be used for the communication with respect to the mobile station MS is registered as a using channel, in correspondence with the address of the mobile station MS, as shown in FIG. 7.

The communication nodes in each of the layers of the hierarchical structure carries out the location management of each of the mobile stations MS based on the routing tables described above. In other words, the location of each mobile station MS is managed in correspondence with a communication node in an immediately lower layer to which the packets are to be transferred.

The base station BS which receives the location registration request signal from the mobile station MS transmits a location registration response signal with respect to the mobile station MS. This location registration response signal includes location information which is formed by the node numbers of each of the communication nodes in the higher layers connected to the base station BS. The mobile station MS stores therein the location information which is received from the base station BS.

Next, a description will be given of a location registration updating process which is carried out when the location registered mobile station moves, so as to update the routing table shown in FIGS. 4 through 7 at each of the communication nodes.

Figure 8:
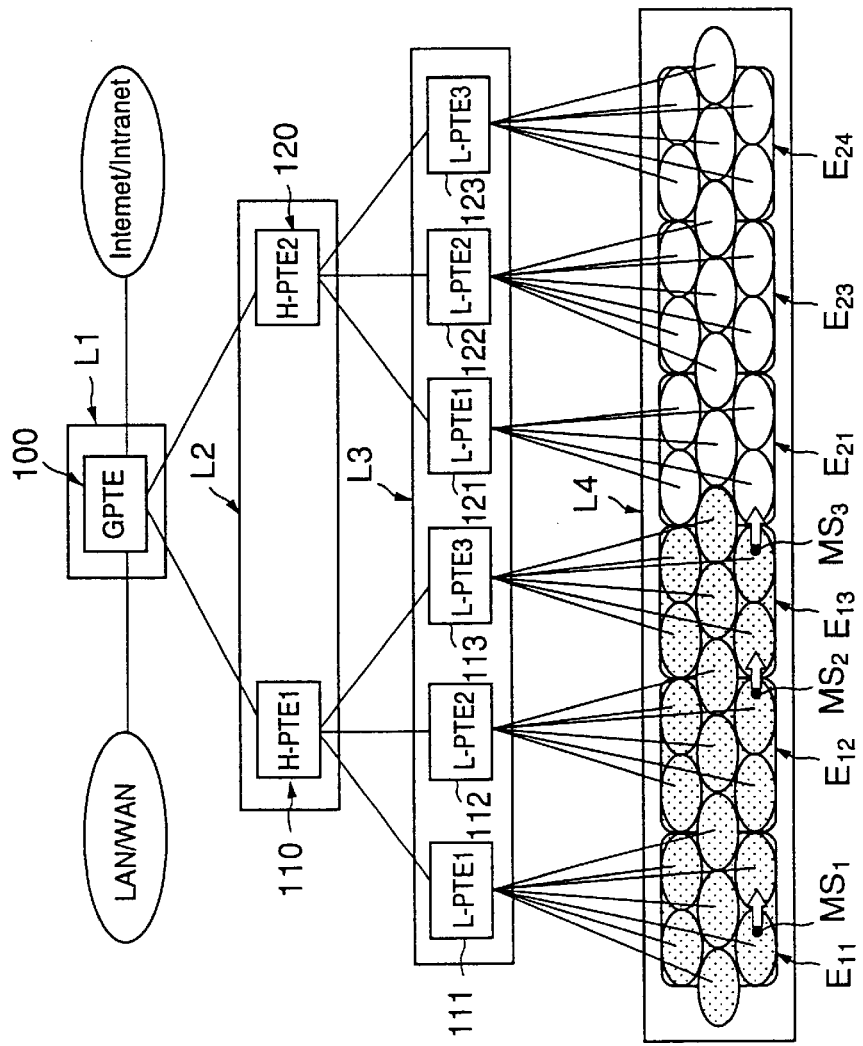
FIG. 8 is a diagram showing a move of the mobile station in the mobile wireless packet communication system.

When a mobile station MS1 in a standby state moves between the cells within a paging area E11 shown in FIG. 8, that is, moves between the cells of the base stations which are under control of the same L-PTE 111, for example, the mobile station MS1 does not transmit a location registration update request signal with respect to the base station of the cell to which the mobile station MS1 moves, in order to reduce a communication traffic for the location registration updating process.

More particularly, the mobile station MS1 compares the registered location information stored therein and the node numbers of each of the communication nodes in the higher layers connected to the base station of the cell to which the mobile station MS1 moves, which node numbers are included in the broadcast control information received from the base station of the cell to which the mobile station MS1 moves. When the L-PTE node number included in the location information matches the L-PTE node number of the L-PTE 111 positioned in the layer higher than that of the base station of the cell to which the mobile station MS1 moves, the mobile station MS1 does not transmit a location registration update request signal with respect to the base station of the cell to which the mobile station MS1 moves. For this reason, while the mobile station MS1 moves within the same paging area E11, the routing table of each of the communication nodes L-PTE 111, H-PTE 110 and GPTE 100 is not updated.

Figure 9:
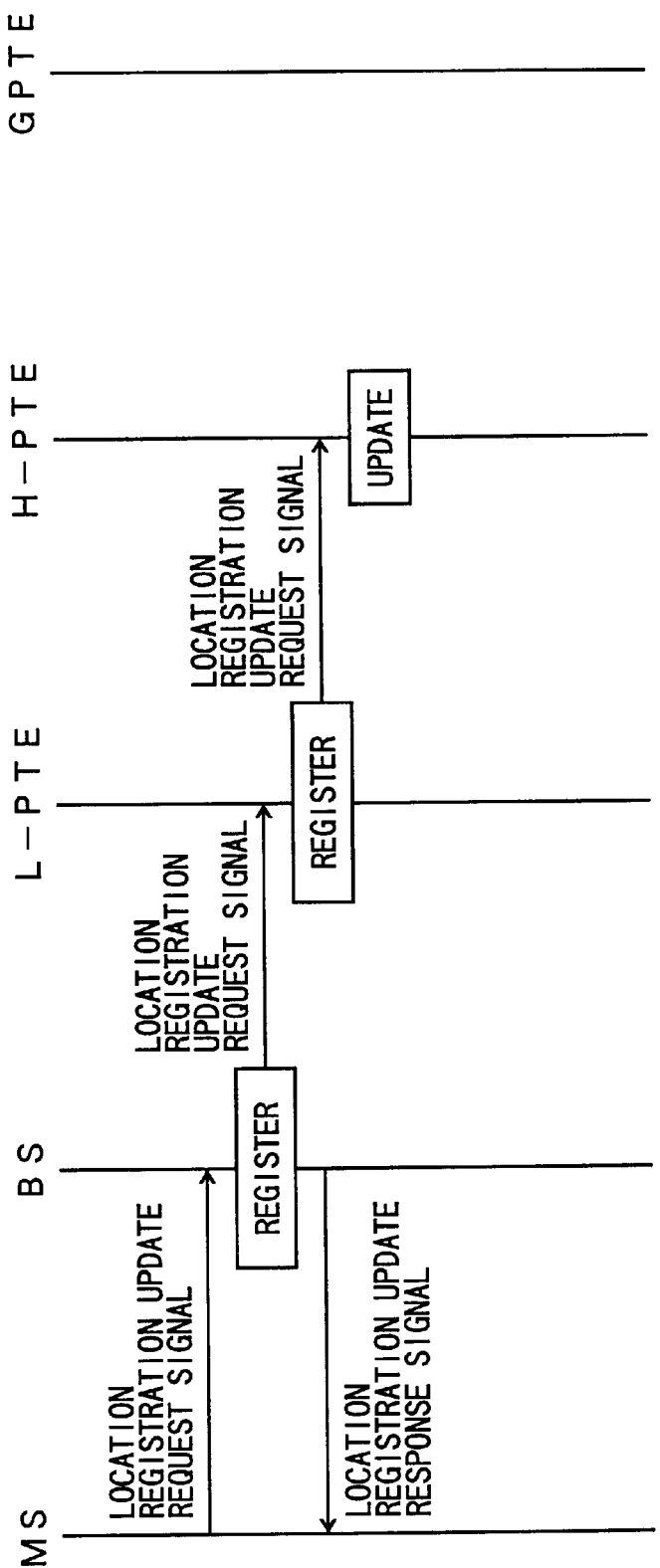
FIG. 9 is a sequence diagram showing a first embodiment of a procedure for updating location registration of the mobile station.

Next, when a mobile station MS2 in the standby state moves between different paging areas E12 and E13 corresponding to the L-PTEs 112 and 113 which are under the control of the same H-PTE 110 as shown in FIG. 8, the location registration updating process is carried out according to a procedure shown in FIG. 9.

In FIG. 9, the mobile station MS2 compares the registered location information stored therein and the node numbers of each of the communication nodes in the higher layers connected to the base station BS of the cell to which the mobile station MS2 moves, which node numbers are included in the broadcast control information received from the base station BS of the cell to which the mobile station MS2 moves. When a change in the L-PTE node number included in the location information is detected from the comparison with the node numbers of each of the L-PTE 113, H-PTE 110 and GPTE 100 positioned in the layers higher than that of the base station BS of the cell to which the mobile station MS2 moves, the mobile station MS2 transmits a location registration update request signal with respect to the base station BS of the cell to which the mobile station MS2 moves. The location registration update request signal requests the updating of the routing table at each of the communication nodes as the mobile station MS2 moves. By transmitting the location information stored in the mobile station MS2 together with the location registration update request signal, the base station BS of the cell to which the mobile station MS2 moves is notified of the cell (paging area) from which the mobile station MS2 moved.

The base station BS which receives the location registration update request signal confirms that the mobile station MS2 has moved from another paging area E12 corresponding to the L-PTE 112, based on the location information included in the location registration updated request signal. Thereafter, the base station BS registers in the routing table thereof the address of the mobile station MS2, and also transmits the location registration update request signal with respect to the L-PTE 113 in the higher layer in order to notify the move of the existing mobile station MS2 to the L-PTE 113. The L-PTE 113 which receives the location registration update request signal registers in the routing table thereof the address of the mobile station MS2, and also registers the base station BS in the lower layer as a packet transfer destination in correspondence with the address of the mobile station MS2. Then, the L-PTE 113 transmits the location registration update request signal to the H-PTE 110 in the higher layer. The H-PTE 110 recognizes that the L-PTE corresponding to the paging area in which the mobile station MS2 is located has changed from the L-PTE 112 to the L-PTE 113, based on the location registration updated request signal which is received from the L-PTE 113 in the lower layer. Hence, the H-PTE 110 updates the packet transfer destination corresponding to the address of the mobile station MS2 from the L-PTE 112 (L-PTE2) to the L-PTE 113 (L-PTE3).

Because the mobile station MS2 moves within the paging areas corresponding to the L-PTEs which are under control of the same H-PTE 110, the H-PTE 110 in this case does not transmit a location registration update request signal to the GPTE 100 in the higher layer. As a result, the routing table of the GPTE 100 is not updated.

The base station BS of the cell to which the mobile station MS receives the location registration update request signal from the mobile station MS2, and transmits a location registration update response signal including the location information to the mobile station MS2. Moreover, the mobile station MS2 which receives the location registration update response signal updates the registered location information stored therein to the location information included in the location registration update response signal.

Figure 10:
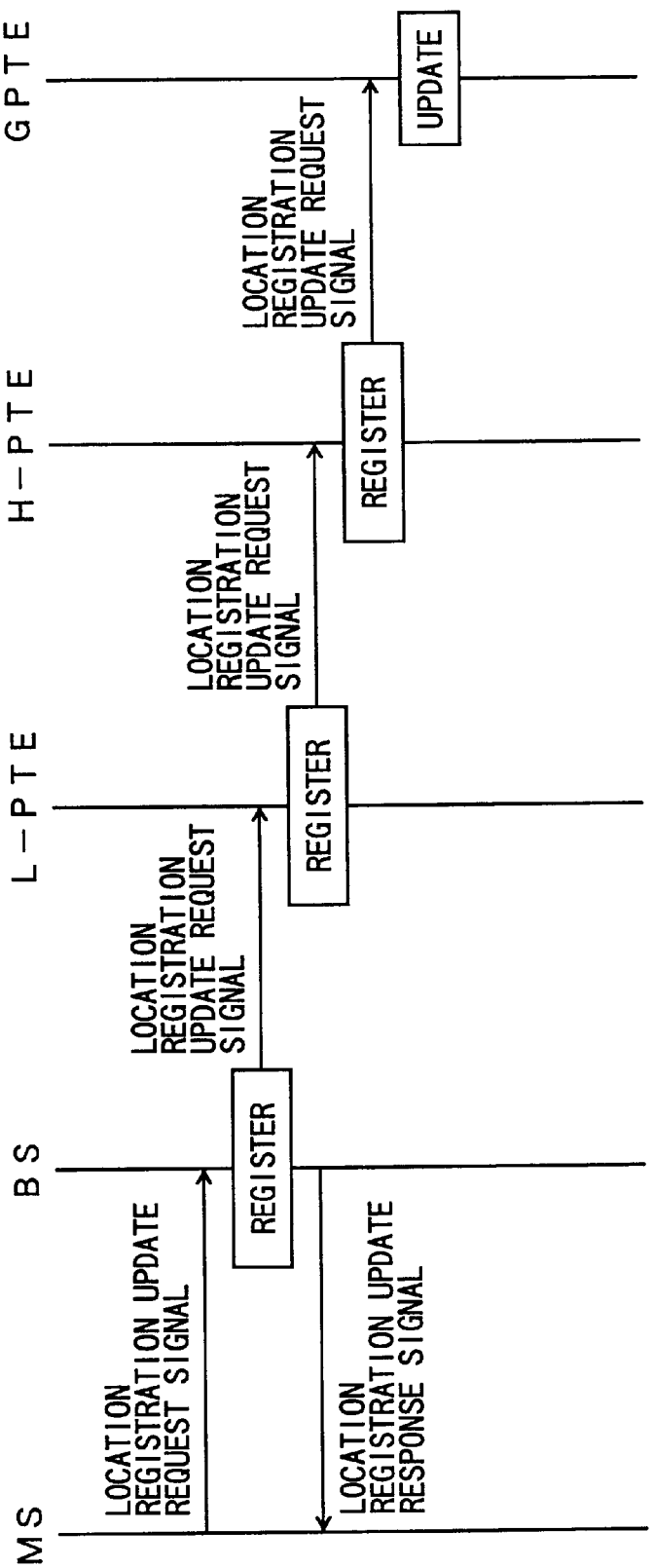
FIG. 10 is a sequence diagram showing a second embodiment of the procedure for updating location registration of the mobile station.

When a mobile station MS3 in the standby state moves between different paging areas E13 and E21 corresponding to the H-PTEs 110 and 120 which are under the control of the same GPTE 100 as shown in FIG. 8, the location registration updating process is carried out according to a procedure shown in FIG. 10.

In FIG. 10, the procedure is basically similar to the procedure for the case where the mobile station MS2 moves between the different paging areas E12 and E13 corresponding to the L-PTEs 112 and 113 which are under the control of the same H-PTE 110 as shown in FIG. 8.

In other words, the mobile station MS3 recognizes the H-PTE 120 which is different from the H-PTE 110 before the move, based on the location information stored in the mobile station MS3 and the node numbers of each of the communication nodes included in the broadcast control information which is received from the base station BS of the cell to which the mobile station MS3 moves, and transmits a location registration update request signal with respect to the base station BS of the cell to which the mobile station MS3 moves. The location registration update request signal is successively transferred from the base station BS of the cell to which the mobile station MS3 moves to each of the L-PTE 121, the H-PTE 120 and the GPTE 100 in the higher layers. In each of the L-PTE 121 and the H-PTE 120, the address of the mobile station MS3 is registered in the routing table thereof, and in addition, the communication node in the lower layer is registered as the packet transfer destination in correspondence with the address of the mobile station MS3. In addition, The GPTE 100 positioned in the highest first layer L1 recognizes from the location registration update request signal which is received from the H-PTE 120 in the lower layer that the H-PTE corresponding to the paging area in which the mobile station MS3 is located has changed from the H-PTE 110 to the H-PTE 120. Hence, the GPTE 100 updates the packet transfer destination corresponding to the address of the mobile station MS3 from the H-PTE 110 (H-PTE1) to the H-PTE 120 (H-PTE2).

In this case, after transmitting the location registration update request signal, the mobile station MS3 updates the location information stored therein based on the location registration update response signal which is received from the base station BS of the cell to which the mobile station MS3 moves.

On the other hand, when the mobile station MS in the active state moves within the communication service area, the location registration updating process is carried out in the following manner.

Figure 11:
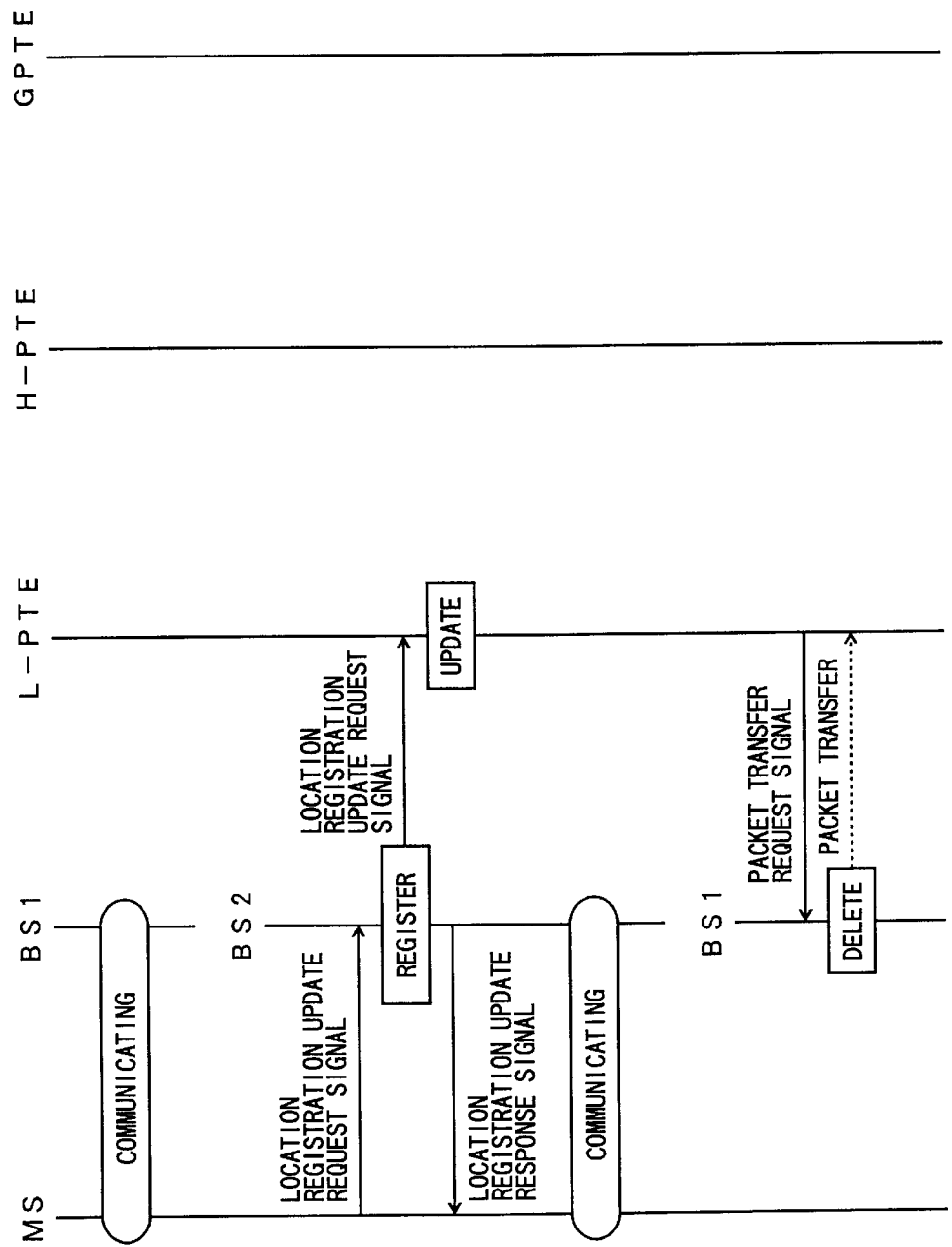
FIG. 11 is a sequence diagram showing a third embodiment of the procedure for updating location registration of the mobile station.

As described above, when the mobile station MS in the standby state moves between the cells within the paging area corresponding to the same L-PTE, no location registration updating process is carried out. But when the mobile station MS in the active state moves between the cells within the paging area corresponding to the same LPTE, the location registration updating process is carried out. In this case, the location registration updating process is carried out according to a procedure shown in FIG. 11, for example.

For example, it is assumed for the sake of convenience that the mobile station MS enters the cell of the base station BS2 while in the active state, that is, communicating with the base station BS1 within the paging area El1. In this case, the mobile station MS detects a change in the located cell in which the mobile station MS is located, based on the broadcast control information from the base station BS2. Hence, the mobile station MS transmits a location registration update request signal with respect to the base station BS2. The base station BS2 registers in the routing table thereof the address of the mobile station MS, and transmits the location registration update request signal to the L-PTE in the higher layer. The L-PTE which receives the location registration update request signal from the base station BS2 detects that the move of the mobile station MS is within the paging area E11 corresponding to this L-PTE, based on the location information before the mobile station MS moves between the cells. Based on the result of this detection, the L-PTE does not transmit a location registration update request signal to the communication nodes positioned in the layers higher than that of the L-PTE.

As a result, in the routing table of the L-PTE, the packet transfer destination corresponding to the address of the mobile station MS is updated from the base station BS1 to the base station BS2 of the cell to which the mobile station MS moves. In addition, since no location registration update request signal is transmitted to the communication nodes which are positioned in the layers higher than that of the L-PTE, the routing table is not updated in each of the H-PTE and the GPTE in the higher layers.

The base station BS2 which updates the routing table thereof based on the location registration update request signal received from the mobile station MS transmits a location registration update response signal including the location information to the mobile station MS. Hence, the mobile station MS updates the location information stored therein to the new location information included in the location registration update response signal which is received from the base station BS2.

When the routing tables in the base station BS2 of the cell to which the mobile station MS moves and the L-PTE in the layer higher than that of the base station BS2 as described above, the packets addressed to the mobile station MS are transferred to the communication nodes in the lower layers based on the routing table of each of the communication nodes. Consequently, the packets addressed to the mobile station MS are finally transferred to the mobile station MS from the base station BS2 of the cell to which the mobile station MS moves.

While the above location registration updating process is being carried out, in some situations, the packets addressed to the mobile station MS may be transferred to the base station BS1 of the cell in which the mobile station MS was located before the move. In order to cope with such situations, the L-PTE which updated the routing table thereof and becomes the communication node in the highest layer, transmits a packet transfer request signal to the base station BS1 of the cell in which the mobile station MS was located before the move. This packet transfer request signal includes a destination, that is, the address of the mobile station MS, to which the packets are to be transferred. The base station BS1 which receives the packet transfer request signal deletes the address of the mobile station MS from the routing table of the base station BS1.

If the packets addressed to the specified destination exist, the base station BS1 transfers the packets to the L-PTE. As a result, after the above described location registration updating process ends, the packets addressed to the mobile station MS are again transferred from the L-PTE to the base station BS2 of the cell to which the mobile station MS moves, based on the updated routing table. By such a re-transfer of the packets, it is possible to prevent loss of the packets.

In addition, in a case where the mobile station MS in the active state moves between the paging areas corresponding to different L-PTEs which are under the control of the same H-PTE, the location registration updating process is basically carried out similarly to the procedure described above in conjunction with FIG. 11. In this case, the location registration update request signal from the mobile station MS is successively transferred from the base station BS of the cell to which the mobile station MS moves to the H-PTE via the L-PTEs, and the routing table of each of the communication nodes, that is, each of the L-PTEs in the route to the H-PTE is updated accordingly.

Then, a packet transfer request signal is transmitted from the H-PTE to the base station BS of the cell in which the mobile station MS was located before the move. As a result, when the packets addressed to the mobile station MS arrive at the base station BS of the cell in which the mobile station MS was located before the move, the packets are transferred from this base station BS to the HPTE which becomes a common communication node which is common to the route reaching the base station BS of the cell in which the mobile station MS was located before the move and the route reaching the base station BS of the cell to which the mobile station MS moved.

Furthermore, in a case where the mobile station MS in the active state moves between the paging areas corresponding to different H-PTEs which are under the control of the same GPTE, the location registration updating process is basically carried out similarly to the procedure described above in conjunction with FIG. 11. In this case, the location registration update request signal from the mobile station MS is successively transferred from the base station BS of the cell to which the mobile station MS moves to the GPTE, and the routing table of each of the communication nodes in the route to the GPTE is updated.

Then, a packet transfer request signal is transmitted from the GPTE to the base station BS of the cell in which the mobile station MS was located before the move. As a result, when the packets addressed to the mobile station MS arrive at the base station BS of the cell in which the mobile station MS was located before the move, this base station BS transfers the packets to the GPTE which becomes a common communication node which is common to the route reaching the base station BS of the cell in which the mobile station MS was located before the move and the route reaching the base station BS of the cell to which the mobile station MS moved.

According to the above described location managing method for managing the location of the mobile station in the mobile wireless packet communication system, the communication nodes are hierarchically arranged down to the base stations. At each communication node, the routing table manages the address of the mobile station in correspondence with the communication node in the lower layer to which the packets are to be transferred, so that the location management of the mobile stations can be carried out distributedly. In addition, when transferring the packets to the mobile station from a certain communication node, it is only necessary to search the route to the communication nodes in the layers lower than this certain communication node, thereby facilitating the search for the route.

Furthermore, unless the move of the mobile station changes the communication nodes in the higher layers, the location registration updating process need only be made in the communication nodes in the lower layers. Therefore, it is possible to reduce the communication traffic which would otherwise be necessary to carry out the location registration updating process in the communication nodes positioned in the higher layers.

In this embodiment, the mobile wireless packet communication system has a network structure with four layers, as shown in FIGS. 1 and 8. However, the number of layers of the network structure is of course not limited to four. For example, it is possible to provide a layer of middle-layer packet transmission equipments (M-PTEs) between the layer of the L-PTE and the layer of the H-PTE. In this case, the M-PTE is defined as a communication node having a routing function when transferring the packets to the communication nodes in the lower layer, that is, the L-PTEs, similarly as in the case of the M-PTE and the H-PTE.

It is possible to set the paging area for each mobile station, depending on what the mobile station treats as the broadcast control information, that is, which node number within the broadcast control information is referred to by the mobile station. In the above described embodiment, the range of all of the base stations under the control of the L-PTE is basically the paging area. However, when the called frequency is small and the mobile station moves over a wide moving range, the node number which is referred to may be changed to the node number of the communication nodes in the higher layers to set a paging area which has a wide range. For example, the node number which is referred to may be changed to the node number of the H-PTE or the GPTE. In this case, the H-PTE or the GPTE will require a paging function.

In the above described embodiment, the routing information and the registered location information are controlled in the network having the hierarchical structure in which the communication nodes are connected hierarchically. However, even in the case of a planar network in which the communication nodes are connected in a mesh, for example, the control of the routing information and the registered location information may similarly be applied, so as to logically carry out a hierarchical management.

As described above, according to the present invention, the processing load on each of the communication nodes when searching the routes of the mobile station is relatively small, because of the distributed management which is carried out. In addition, when the mobile station moves to a cell of another base station, the process to change the routing management with respect to the mobile station only needs to be carried out in the communication nodes in the differing route portion between the route portion reaching the base station of the cell in which the mobile station was located before the move and the route reaching the base station of the cell to which the mobile station moved. Accordingly, the processing load when updating the location information of the mobile station is reduced. In addition, according to the present invention, it is possible to provide a mobile wireless packet communication system which is applied with the location managing method for managing the location of the mobile station described above.

Further, the present invention is not limited to these embodiments, but various variations and modifications may be made without departing from the scope of the present invention.

What is claimed is:

1. A method for managing a location of a mobile station in a mobile wireless packet communication system in which a plurality of communication nodes form a hierarchical structure, comprising:

distributedly managing a first route from a communication node positioned at a highest layer of the hierarchical structure to a first base station of a cell in which a mobile station is located, said distributedly managing performed by each communication node in the first route in accordance with mobile station location information; and when said mobile station communicating moves to a cell of a second base station, returning a packet addressed to said mobile station from each communication node positioned in the first route to a communication node which is positioned in both the first route and in a second route, said second route from the communication node positioned at the highest layer of the hierarchical structure to the second base station, said communication nodes returning the packet positioned lower in the first route than the communication node in the first and second routes, wherein said cell of said second base station is different from said cell of said first base station.

2. A mobile wireless packet communication system comprising:

a plurality of communication nodes formed in a hierarchical structure; and a first route from a communication node positioned at a highest layer of the hierarchical structure to a first base station of a first cell in which a mobile station is located, said first route distributedly managed in accordance with mobile station location information by each communication node in the first route, wherein a packet addressed to said mobile station is successively transferred from the communication node positioned at the highest layer of the hierarchical structure to the first base station, each of the communication nodes in the first route includes a routing table configured to manage a portion of the first route, when said mobile station moves to a second cell of a second base station, a communication node which is positioned at a layer higher than the second base station receives a location registration updated request signal from the mobile station via the second base station and updates a local routing table, and said second base station is different from said first base station, and said second cell is different from said first cell, each communication node in a route from a communication node which is common to the first route an the second route deletes from a routing table thereof management information corresponding to the first route, each communication node positioned in layers lower than the common communication node and in the first route returns the packet addressed to the mobile station to the common communication node.

3. The mobile wireless packet communication system of claim 2, wherein:

each communication node returning the packet is configured to receive a packet transfer request signal from the common communication node.

4. A mobile wireless packet communication system, comprising:

a plurality of communication nodes and base stations in communicable relation according to a hierarchical structure; and a route from a communication node positioned at a highest layer of the hierarchical structure to a base station of a cell in which a mobile station is located, said route managed in accordance with mobile station location information by each communication node in the route;

means for paging the mobile station from a plurality of base stations under control of a predetermined communication node;

means for receiving a location registration update request signal from the mobile station;

means for determining when the mobile terminal moves from a base station in a first cell to an other base station, said other base station located in a second cell; and means for updating one or more routing tables of communication nodes in a second route from the communication node positioned at the highest layer of the hierarchical structure to the other base station and which are not part of the first route, when (i) the mobile station moves from the base station to the other base station; and (ii) the means for receiving receives the location registration update request signal, such that when the mobile station moves to the second cell in a reception waiting state and does not transmit the location registration update request signal, the updating means is not activated, wherein a packet addressed to the mobile station is successively transferred from the communication node in the highest layer to one of the base station and the other base station along the respective first and second routes, and each communication node comprises a routing table configured to manage a portion of an assigned route from the communication node positioned at the highest layer of the hierarchical structure to a current base station of a current cell in which the mobile station is located.

5. The mobile wireless packet communication system of claim 4, further comprising:

means for determining whether or not to transmit a location registration update request signal from the mobile station in accordance with a paging area in which the mobile station is located.

6. The mobile wireless packet communication system of claim 5, further comprising:

means for setting the paging area from the mobile station in accordance with a node number.

7. The mobile wireless packet communication system of claim 6, further comprising:

means for deleting management information of a portion of the first route from a routing table of a communication node located below a communication node located in both the first and second routes when the mobile station assumes a communication state with the other base station.

8. The mobile wireless packet communication system of claim 7, further comprising:

means for transmitting a packet transfer request signal to the base station of the first route before the mobile station moves from the first route to the second route.

9. The mobile wireless packet communication system of claim 8, further comprising:

means for returning a packet to one of the communication nodes in the first route, said means for returning a packet responsive to the packet transfer request signal.

10. The mobile wireless packet communication system of claim 8, further comprising:

means for returning the packet addressed to the mobile station to the common communication node from each communication node in the first route in a layer lower than the common communication node.

11. A communication node for a mobile wireless packet communication system including a plurality of communication nodes and base stations in communicable relation according to a hierarchical structure, wherein a route from a communication node positioned at a highest layer of the hierarchical structure to a base station of a cell in which a mobile station is located is managed in accordance with mobile station location information distributed to each communication node in the route, and a packet addressed to the mobile station is successively transferred from the communication node in the highest layer to the base station in accordance with the route which is distributedly managed so as to transfer the packet from the base station to the mobile station by a wireless communication, each communication node comprising:

a routing table configured to manage a portion of the route, wherein said mobile wireless packet communication system includes means for paging the mobile station from a plurality of base stations under control of a predetermined communication node, means for receiving a location registration update request signal from the mobile station, means for determining when the mobile terminal moves from a base station in a first cell to an other base station in a second cell, and means for updating one or more routing tables of communication nodes in a route to the other base station in the second cell and which did not manage a portion of the route to the base station of the first cell, when:
  (i) the mobile station moves from the base station of the first cell to the base station of the second cell, and
  (ii) the means for receiving receives the location registration update request signal, such that when the mobile station moves to the second cell in a reception waiting state and does not transmit the location registration update request signal, the updating means is not activated.

* * * * *